(12) United States Patent  
Daye et al.

(10) Patent No.: US 9,093,062 B2
(45) Date of Patent: Jul. 28, 2015

(54) MULTILINGUAL SPEECH RECOGNITION AND PUBLIC ANNOUNCEMENT

(71) Applicant: International Business Machines Corporation, Armonk, NY (US)

(72) Inventors: Sheri G. Daye, Boca Raton, FL (US); Peeyush Jaiswal, Boca Raton, FL (US); Aleksas J. Vitenas, Tinton Falls, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/606,055

(22) Filed: Jan. 27, 2015

(65) Prior Publication Data

US 2015/0142431 A1    May 21, 2015

Related U.S. Application Data

(63) Continuation of application No. 13/304,983, filed on Nov. 28, 2011.

(51) Int. Cl.
G06F 17/20       (2006.01)
G10L 13/00       (2006.01)
G10L 21/00       (2013.01)
G10L 25/00       (2013.01)
G10L 15/00       (2013.01)
H04R 27/00       (2006.01)
G10L 25/54       (2013.01)

(52) U.S. Cl.
CPC .............. *G10L 15/005* (2013.01); *G10L 25/54* (2013.01); *H04R 27/00* (2013.01)

(58) Field of Classification Search
USPC ......................................... 704/7, 8, 258, 274
See application file for complete search history.

(56) References Cited

U.S. PATENT DOCUMENTS

| 5,333,180 | A | * | 7/1994 | Brown et al. | 379/88.06 |
| 5,375,164 | A | * | 12/1994 | Jennings | 379/88.05 |
| 5,440,615 | A | * | 8/1995 | Caccuro et al. | 379/88.06 |
| 5,917,944 | A | * | 6/1999 | Wakisaka et al. | 382/190 |
| 6,061,646 | A | | 5/2000 | Martino et al. | |
| 6,496,570 | B1 | * | 12/2002 | Nimphius | 379/88.25 |

(Continued)

OTHER PUBLICATIONS

Kovari et al., "Mobile Applications with IBM WebSphere Everyplace Access Design and Development," IBM Redbooks, Chapter 3.2: Speech Recognition, pp. 36-47, Oct. 2001, <http://www.redbooks.ibm.com/redbooks/pdfs/sg246259.pdf>.

(Continued)

*Primary Examiner* — Olujimi Adesanya
(74) *Attorney, Agent, or Firm* — Noah A. Sharkan

(57) ABSTRACT

Embodiments of the present invention provide a system, method, and program product to deliver an announcement to people, such as a public announcement. A computer receives input representative of audio from one or more people speaking in one or more natural languages. The computer processes the input to identify the languages being spoken, and identifies a relative proportion of each of the identified languages. Using these proportions, the computer determines one or more languages in which to deliver the announcement. The computer then causes to be delivered the announcement in the determined languages. In other embodiments, the computer can also determine an order in which to deliver the announcement. Further, the computer can transmit the announcement in the determined languages and order for delivery in aural or visual form.

20 Claims, 3 Drawing Sheets

(56) References Cited

U.S. PATENT DOCUMENTS

| | | | |
|---|---|---|---|
| 8,185,374 B2* | 5/2012 | Kong et al. | 704/3 |
| 8,321,212 B2* | 11/2012 | Kim | 704/208 |
| 8,380,507 B2* | 2/2013 | Herman et al. | 704/260 |
| 8,392,173 B2* | 3/2013 | Davis et al. | 704/3 |
| 8,756,051 B2* | 6/2014 | Noldus et al. | 704/8 |
| 2002/0105959 A1* | 8/2002 | Laurin | 370/432 |
| 2002/0111146 A1* | 8/2002 | Fridman et al. | 455/99 |
| 2004/0243392 A1* | 12/2004 | Chino et al. | 704/7 |
| 2008/0071518 A1* | 3/2008 | Narayanan et al. | 704/2 |
| 2008/0115163 A1* | 5/2008 | Gilboa et al. | 725/34 |
| 2008/0300880 A1* | 12/2008 | Gelbman | 704/256 |
| 2010/0017193 A1 | 1/2010 | Runge et al. | |
| 2010/0299142 A1* | 11/2010 | Freeman et al. | 704/9 |
| 2012/0004899 A1* | 1/2012 | Arshi | 704/8 |

OTHER PUBLICATIONS

"Multilingual Speech Recognition and Public Announcement", U.S. Appl. No. 13/304,983, filed Nov. 28, 2011.

* cited by examiner

US 9,093,062 B2

MULTILINGUAL SPEECH RECOGNITION AND PUBLIC ANNOUNCEMENT

FIELD OF THE INVENTION

The present invention relates generally to speech recognition and public announcement systems, and more particularly to multilingual language recognition, including recognition of multiple languages spoken simultaneously, and dynamic language order in public announcement systems.

BACKGROUND

Speech recognition systems have become embedded in many technological fields and much of daily life. For example, smart phones, personal computers, and automobile navigation systems are capable of recognizing and responding to voice commands. With advances in long-distance travel and communications, the degree to which diverse languages are intersecting is growing rapidly. Language recognition systems, which recognize a user's spoken or written language and respond accordingly, are therefore becoming increasingly important to provide quick and efficient access to information in multiple languages.

Language recognition systems are useful in airports, train stations, and other public venues where lingual diversity is high. At these venues, many approaches to language recognition and multilingual information delivery tend to involve single-user interactions with an information kiosk, telephonic information system, or other information terminal. Single-user systems may be capable of recognizing a single user's spoken language and responding accordingly, but a system for identifying the lingual composition of a large number of users and delivering information in multiple languages, such as by public announcement, would also be useful.

Multilingual public announcement methods at the above-mentioned public venues typically consist of aural or visual announcements in a primary language, followed by the same announcement in one or more secondary languages. The languages chosen for the announcements, and the order in which they are delivered, are typically preconfigured. For example, the primary language for an audio announcement at an international airport terminal may be the national language, the second language may be English, and the final language may be the regional language. Consequently, if the announcement is lengthy or must be repeated in several languages, travelers who only understand one of the secondary languages might wait a considerable amount of time to receive the information in their native languages, if at all. Because of the static nature of these announcement methods, announcements might also unnecessarily be delivered in multiple languages when at that moment the public audience speaks only a single language.

Accordingly, there exists a need in the art to overcome the deficiencies and limitations described hereinabove.

SUMMARY

Embodiments of the present invention provide a system, method, and program product to deliver an announcement. A computer receives input representative of audio from one or more human speakers speaking in one or more natural languages. The computer processes the input to identify the languages being spoken, and identify a relative proportion of usage of each of the identified languages. The computer determines one or more languages in which to deliver the announcement based, at least in part, on the relative proportion of each of the identified languages. The computer then causes the announcement to be delivered in the determined one or more natural languages.

In other embodiments, the computer, prior to causing the announcement to be delivered, can determine an order in which to deliver the announcement based, at least in part, on the relative proportion of people speaking each of the identified languages. The computer can transmit the announcement, which can be stored on the computer in multiple languages, in the determined one or more languages and order. Alternatively, the computer can transmit instructions regarding the appropriate languages and order in which to deliver an announcement. The computer can be programmed to receive and process the input, as well cause the announcement to be delivered, at set intervals of time. The announcement can be delivered aurally, visually, or both.

DETAILED DESCRIPTION

In brief summary, a preferred embodiment of the present invention is practiced in the context of a public announcement system at a mass-transit passenger terminal, such as an airport passenger terminal, where the invention is integrated with the terminal's existing announcement system of audio speakers and visual displays. Multiple microphones are strategically installed around the terminal to capture audio of passengers casually speaking in one or more languages, and to pass the audio to a computing device. The term "language," as used in this specification, refers to natural languages used for human communication such as, for example, English, Spanish, French, and German.

The audio signals are processed by the computing device to identify the languages being spoken and determine the approximate proportion of human speakers using each of the identified languages. The identified languages are ranked according to their usage to assist in establishing an order in which to deliver announcements. After factoring in any other delivery requirements with respect to language order and adjusting the delivery order accordingly, the public announcement messages stored on the computing device are transmitted to the airport terminal's announcement system in the appropriate languages and order for delivery to the passengers in the terminal. For example, it may be determined that 20 percent of the passengers are speaking English, 10 percent are speaking Spanish, and 70 percent are speaking German. If no other delivery requirements are specified, the stored public announcements are transmitted to the airport terminal's announcement system for delivery in the following order and languages: German, English, and Spanish.

Embodiments of the present invention will now be described in detail with reference to the accompanying drawings.

Figure 1:
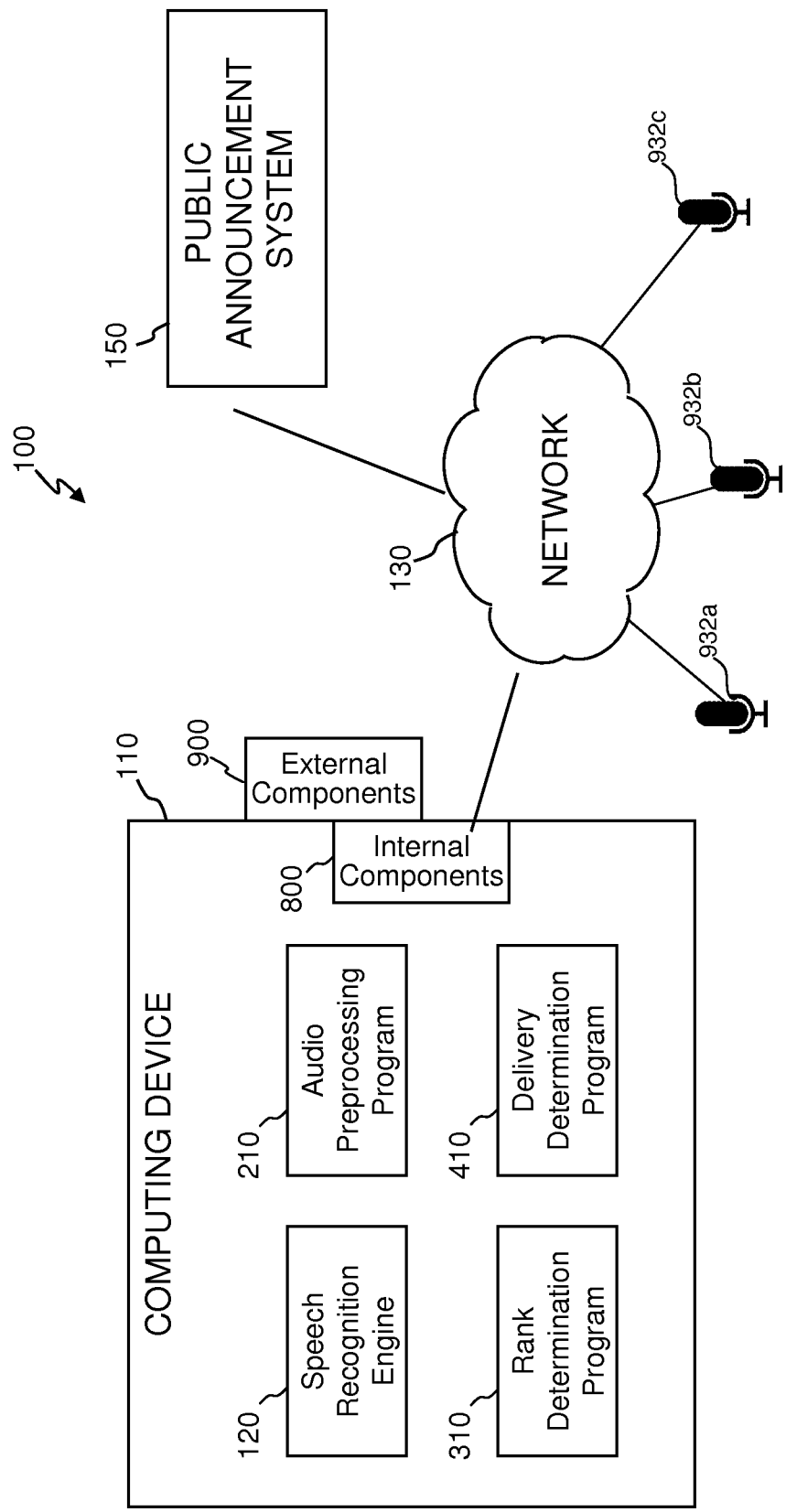
FIG. 1 is a functional block diagram of a language recognition and public announcement system 100 in accordance with an embodiment of the present invention.

FIG. 1 is a functional block diagram illustrating a language recognition and public announcement system 100 in accordance with an embodiment of the present invention. Language recognition and public announcement system 100 includes a computing device 110, microphones 932a, 932b and 932c, and public announcement system 150, all interconnected over a network 130. While FIG. 1 depicts three microphones 932, embodiments of the present invention can incorporate a greater or lesser number of microphones.

Computing device 110 receives the output of microphones 932. Computing device 110 includes speech recognition engine 120, audio preprocessing program 210, rank determination program 310, and delivery determination program 410, which process the output of microphones 932 and output information or announcements to public announcement system 150, via network 130. Computing device 110 includes internal components 800 and external components 900. Computing device 110 can be a laptop computer, desktop computer, a computer server, or any other computing device known in the art. In general, computing device 110 can be any programmable electronic device as described in further detail with regard to FIG. 3.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between computing device 110, microphones 932, and public announcement system 150 in accordance with a desired embodiment of the invention.

Public announcement system 150 receives the output of computing device 110 and delivers one or more public announcements to people. In a preferred embodiment, public announcement system 150 is an aural and visual announcement system at a mass-transit passenger terminal, which includes a plurality of audio speakers and visual display screens to deliver public announcements to travelers. Public announcement system 150 can include, for example, a laptop computer, desktop computer, or a computer server configured with the necessary hardware and software to deliver public announcements to people. In another embodiment, public announcement system 150 stores the announcements in multiple languages and is a stand-alone announcement system, and receives from computing device 110 instructions regarding the appropriate languages and order in which to deliver the announcements.

Figure 2:
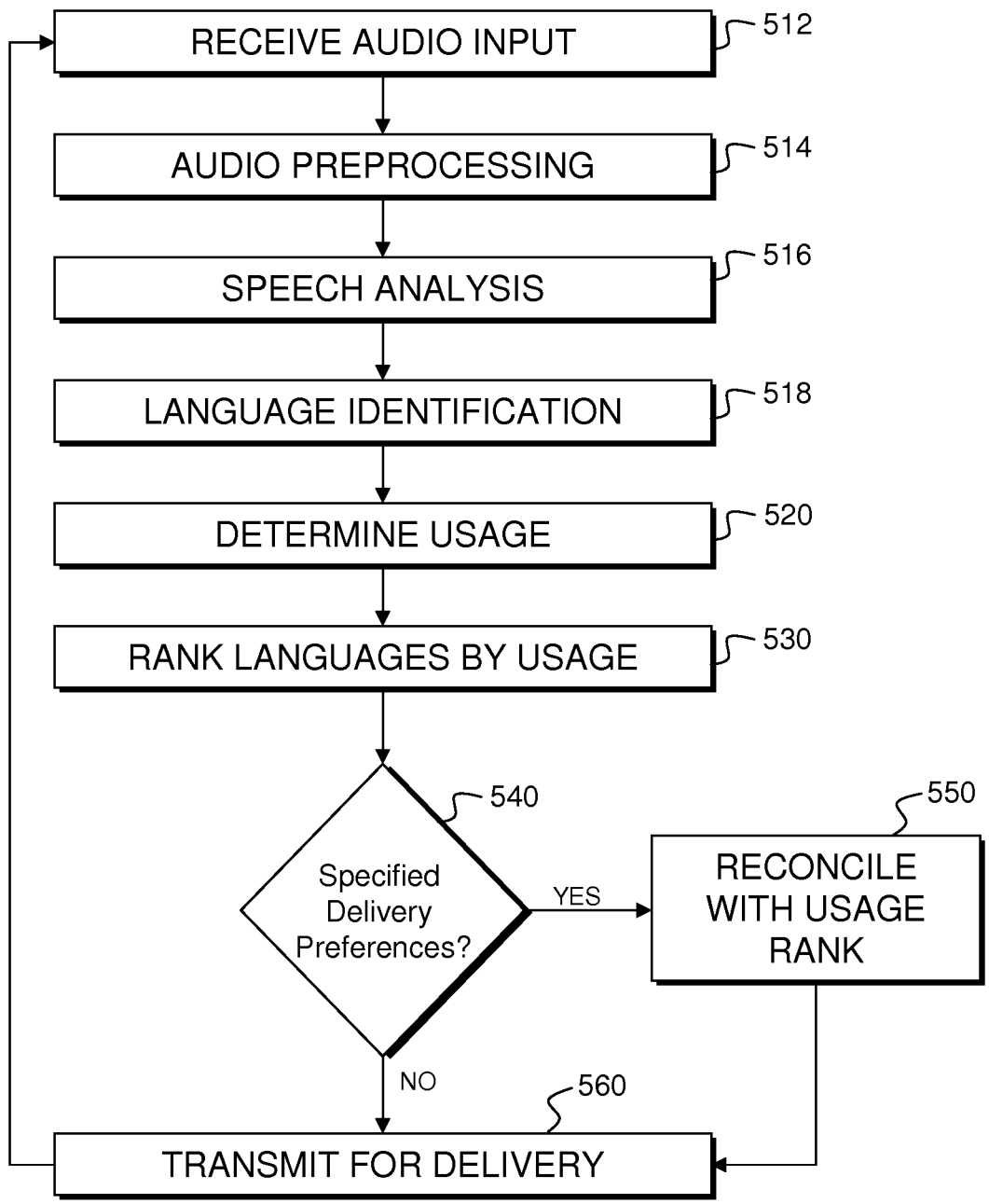
FIG. 2 is a flowchart illustrating the basic operational steps for an embodiment of the present invention.

FIG. 2 is a flowchart illustrating the basic operational steps of a language recognition and public announcement system 100 in accordance with an embodiment of the present invention. In step 512, audio signals from microphones 932 are received by computing device 110, via network 130. The audio signals, which can be representative of multiple people speaking in multiple languages, are received by audio preprocessing program 210. In a preferred embodiment, the audio signals from each microphone are transmitted on separate channels, such that each channel's audio signals can be processed separately in later steps.

In step 514, audio preprocessing program 210 performs any necessary preprocessing of the audio signals. In a preferred embodiment, preprocessing includes adjusting sound levels and identifying utterances. In this specification, the term "utterance" refers to any sound occurring between two consecutive pauses in speech. After audio preprocessing program 210 preprocesses the audio signals, it passes the identified utterances to speech recognition engine 120.

In step 516, speech recognition engine 120 receives the utterances from audio preprocessing program 210 and further refines the utterances by comparing them with acoustic models representative of the non-speech background noise and acoustical characteristics of the environment, in order to remove background noise and other artifacts.

Typically, speech recognition engine 120 is a speech recognition package capable of receiving audio signals representative of multiple human speakers speaking in one or more languages, and identifying the languages being spoken. Embodiments of the present invention can also include multiple speech engines. A preferred embodiment utilizes a WebSphere® Voice Server V6.1.1 package, available from International Business Machines Corporation of Armonk, N.Y., as speech recognition engine 120.

Speech recognition engine 120 includes one or more dictionaries that store acoustic models of the utterances that need to be identified. In a preferred embodiment, the utterances stored in the dictionaries are phonemes found in each of the languages to be identified. In a preferred embodiment, using dictionaries containing a relatively small number of unique phonemes found in each of the languages to be identified enables faster language identification by minimizing the amount of acoustic model data needed to be stored and processed. In other embodiments, the utterances stored in the dictionaries may be words or phrases comprising multiple phonemes.

In a preferred embodiment, such as the embodiment illustrated in FIG. 2, speech recognition engine 120 also includes a database of custom models of the acoustical environments in which microphones 932 will be deployed. These custom models enable speech recognition engine 120 to account for non-speech background noise and other acoustical characteristics of a given environment, which may help increase the accuracy of language identification.

In step 518, speech recognition engine 120 identifies the languages represented in the received audio signals by comparing the identified utterances received from audio preprocessing program 210 with the dictionaries containing acoustic models of phonemes to be identified in each language in order to find matches. Speech recognition engine 120 also calculates the number of utterance matches for each of the identified languages, for example, in a set time interval. In a preferred embodiment, the utterances from each microphone 932 are received on separate channels, and one or more speech recognition engines 120 process the channels to calculate a total number of utterance matches found for each identified language, across all channels. After the number of utterance matches for each language is calculated, speech recognition engine 120 determines, in step 520, a relative proportion of utterance matches for each language, which represent an approximation of the relative proportions of people speaking each identified language. In the event that no utterance matches are made, in step 520, speech recognition engine 120 would determine relative proportions of zero for each language it is capable of recognizing (i.e., each language for which it has a dictionary of acoustic models of utterances in that language).

In another embodiment, total utterance matches are calculated based on the first identified utterance match found on each microphone channel, rather than a total of all identified utterance matches found in a time interval. For example, if speech recognition engine 120, processing ten microphone channels separately, first identified an English utterance match on four of the channels, and a Spanish utterance match on the other six channels, then the total number of utterance matches calculated would be four English and six Spanish. Calculating total utterance matches based on the first identified utterance found on each microphone channel may increase the rate at which languages can be identified among a group of people speaking multiple languages because computing resources can be reallocated after identifying the first utterance match on each channel. Increased accuracy in approximating the lingual composition of the group may be achieved by placing more microphones 932 in more locations among the members of the group.

In step 530, rank determination program 310 receives the calculated proportions of utterance matches for each language, and ranks the identified languages based on their relative proportions of utterance matches. For example, in a preferred embodiment, rank determination program 310 ranks the identified languages in descending order, with the identified language having the largest proportion of utterance matches ranked first, and the language having the lowest proportion of utterance matches ranked last. The language ranking is then passed to delivery determination program 410. If no languages were identified (i.e., the proportions of utterance matches for each language were zero), rank determination program 310 passes to delivery determination program 410 a null language ranking. A "null language ranking," as used in this specification, means that no languages were identified and therefore no language ranking was determined.

In step 540, delivery determination program 410 receives the language ranking from rank determination program 310 and operates to determine the languages and an order in which to deliver public announcements. Delivery determination program 410 compares the language ranking from rank determination program 310 with any administrator-specified delivery requirements. For example, at an international airport terminal in the United States, administrator-specified delivery requirements may include always delivering the first public announcement in English. If delivery requirements are specified, then in step 550, delivery determination program 410 reconciles the delivery requirements with the language ranking determined by rank determination program 310 and determines a final delivery order. If no delivery requirements are specified, then the language ranking from rank determination program 310 is the final delivery order. For example, the language ranking received from rank determination program 310 might be, in descending order: German, English, and Spanish. An administrator-specified delivery requirement might include always delivering announcements in English first. In this example, delivery determination program 410 would reconcile the language ranking with the delivery requirement and determine the following final delivery order, in descending order: English, German, and Spanish.

In a preferred embodiment, administrator-specified delivery requirements include predefined languages and an order in which to deliver the announcement in the event delivery determination program 410 receives a null language ranking from rank determination program 310. In step 550, delivery determination program 410 would reconcile the delivery requirements with the null language ranking determined by rank determination program 310 and determine the predefined delivery languages and order to be the final delivery order.

At step 560, in a preferred embodiment, delivery determination program 410 transmits versions of a public announcement, which are stored in multiple languages on computing device 110, to public announcement system 150 in the appropriate languages and order. Public announcement system 150 can then deliver the announcements aurally, visually, or both, by a plurality of audio speakers and visual displays. In another embodiment, public announcement system 150 stores a public announcement in multiple languages, and at step 560, delivery determination program 410 transmits the final language ranking to public announcement system 150 as instructions regarding the order and languages in which to deliver the announcement (i.e., which versions of the public announcement stored on public announcement system 150 to deliver, and in what order). After step 560, the above-mentioned operations can begin again at step 512.

Operational steps 512 through 560 are illustrative of one or more embodiments of the present invention. It should be understood that the content of each step, as well as the order of steps, can be modified without departing from the spirit and intended scope of the present invention. For example, in a preferred embodiment, steps 512 through 560 are performed continuously, so as to analyze people speaking and respond accordingly in real-time. In another embodiment, steps 512 through 550 can be performed at set intervals of time, so as to afford language recognition and public announcement system 100 more time collect a representative sample of people speaking multiple languages and respond accordingly.

Figure 3:
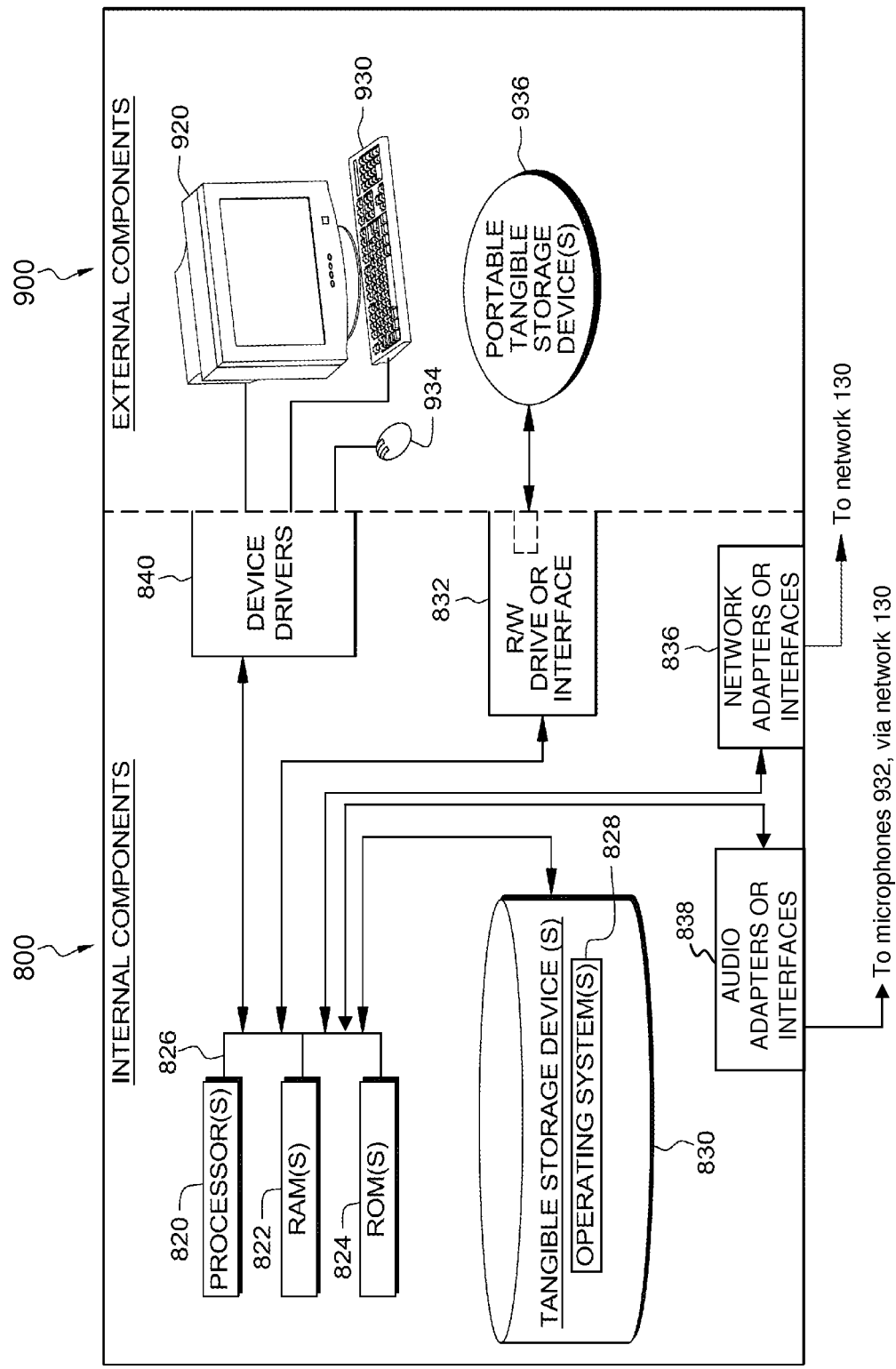
FIG. 3 is a block diagram of hardware and software within and external to the computing device of FIG. 1 in accordance with an embodiment of the present invention.

FIG. 3 shows a block diagram of internal components 800 and external components 900 of a computing device 800, 900, such as computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Computing device 800, 900 is representative of any electronic device capable of executing machine-readable program instructions. Computing device 800, 900 may be representative of a computer system or other electronic devices. Examples of computing systems, environments, and/or configurations that may represented by computing device 800, 900 include, but are not limited to, personal computer systems, server computer systems, thin clients, thick clients, laptop devices, multiprocessor systems, microprocessor-based systems, network PCs, minicomputer systems, and distributed cloud computing environments that include any of the above systems or devices.

Computing device 110 includes a set of internal components 800 and external components 900. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, programs 210, 310, and 410, and speech recognition engine 120 in computing device 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 210, 310, and 410, and speech recognition engine 120 in computing device 110 can be stored on one or more of the respective portable computer-readable tangible storage devices 936, read via the respective R/W drive or interface 832 and loaded into the respective hard drive 830.

Internal components 800 also includes audio adapters or interfaces 838 such as a sound card, hardware mixer, amplifier, or other adapters or interfaces for receiving the audio signals from microphones 932.

Internal components 800 also includes network adapters or interfaces 836 such as a TCP/IP adapter cards, wireless wi-fi interface cards, or 3G or 4G wireless interface cards or other wired or wireless communication links. The programs 210, 310, and 410, and speech recognition engine 120 in computing device 110 can be downloaded to computing device 110 from an external computer via a network (for example, the Internet, a local area network or other, wide area network) and respective network adapters or interfaces 836. From the network adapters or interfaces 836, the programs 210, 310, and 410, and speech recognition engine 120 in computing device 110 are loaded into hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

The invention claimed is:

1. A method for delivering an announcement in two or more languages, the method comprising the steps of:
   a computer receiving, from a plurality of microphones deployed in an environment, input representative of audio of a group of human speakers speaking in the environment in two or more natural languages during a duration of time, wherein each microphone of the plurality of microphones transmits respective audio signals on separate channels;
   the computer processing the input to identify the two or more natural languages being spoken in the environment by the group of human speakers during the duration of time;
   the computer processing the audio signals on each channel to identify a first utterance match for one of the identified two or more natural languages;
   for each of the identified two or more natural languages, the computer calculating a number of channels on which a first utterance match for that natural language was identified;
   the computer processing the input to determine a relative proportion of each of the identified two or more natural languages being spoken in the environment by the group of human speakers during the duration of time, wherein the relative proportion of a natural language is based, at least in part, on the calculated number of channels on which a first utterance match for that natural language was identified;
   the computer determining two or more natural languages in which to deliver the announcement based, at least in part, on the determined relative proportion of each of the identified two or more natural languages being spoken in the environment by the group of human speakers during the duration of time;
   the computer determining a descending sequential order in which to deliver the announcement in the determined two or more natural languages based, at least in part, on the relative proportion of each of the identified two or more natural languages; and
   the computer causing to be delivered the announcement in the determined two or more natural languages in the determined descending sequential order by transmitting the announcement to an announcement system.

2. The method of claim 1, wherein the computer transmits for delivery the announcement in the determined two or more natural languages.

3. The method of claim 1, wherein:
   the step of a computer receiving input further comprises:
      a computer receiving input representative of audio from one or more human speakers speaking in two or more natural languages at set intervals of time; and
   the step of the computer causing to be delivered the announcement further comprises:
      the computer causing to be delivered the announcement in the determined two or more natural languages at set intervals of time.

4. The method of claim 1, wherein the announcement is caused to be delivered aurally.

5. The method of claim 1, wherein the announcement is caused to be delivered visually.

6. The method of claim 1, wherein the step of the computer causing to be delivered the announcement in the determined two or more natural languages in the determined descending sequential order comprises:

the computer identifying a specified delivery requirement, wherein the specified delivery requirement specifies a specific language to be delivered first, prior to the determined descending sequential order; and the computer causing to be delivered the announcement in the determined two or more natural languages in the determined descending sequential order subsequent to the specific language of the specified delivery requirement.

7. The method of claim 1, wherein the plurality of microphones are positioned throughout a mass-transit passenger terminal.

8. The method of claim 7, wherein the computer processing the input to identify the two or more natural languages being spoken further comprises:

the computer accessing a model of an acoustical environment corresponding to positioning of the plurality of microphones.

9. The method of claim 1, wherein natural languages being spoken by more human speakers during the duration of time are determined to have a greater relative proportion than natural languages being spoken by fewer human speakers during the duration of time.

10. A computer system for delivering an announcement in two or more languages, the system comprising:

a plurality of microphones deployed in an environment; and one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive, from the plurality of microphones deployed in the environment, input representative of audio of a group of human speakers speaking in the environment in two or more natural languages during a duration of time, wherein each microphone of the plurality of microphones transmits respective audio signals on separate channels;

program instructions to process the input to identify the two or more natural languages being spoken in the environment by the group of human speakers during the duration of time;

program instructions to process the audio signals on each channel to identify a first utterance match for one of the identified two or more natural languages;

program instructions to, for each of the identified two or more natural languages, calculate a number of channels on which a first utterance match for that natural language was identified;

program instructions to process the input to determine a relative proportion of each of the identified two or more natural languages being spoken in the environment by the group of human speakers during the duration of time, wherein the relative proportion of a natural language is based, at least in part, on the calculated number of channels on which a first utterance match for that natural language was identified;

program instructions to determine two or more natural languages in which to deliver the announcement based, at least in part, on the relative proportion of each of the identified two or more natural languages being spoken in the environment by the group of human speakers during the duration of time;

program instructions to determine a descending sequential order in which to deliver the announcement in the determined two or more natural languages based, at least in part, on the relative proportion of each of the identified two or more natural languages; and program instructions to cause to be delivered the announcement in the determined two or more natural languages in the determined descending sequential order by transmitting the announcement to an announcement system.

11. The system of claim 10, wherein the program instructions further comprise program instructions to receive and process the audio input at set intervals of time, and cause to be delivered the announcement in the determined two or more natural languages at set intervals of time.

12. The system of claim 10, wherein the program instructions further comprise program instructions to cause the announcement to be delivered aurally.

13. The system of claim 10, wherein the program instructions further comprise program instructions to cause the announcement to be delivered visually.

14. The system of claim 10, wherein the plurality of microphones are positioned throughout a mass-transit passenger terminal.

15. The system of claim 10, wherein natural languages being spoken by more human speakers during the duration of time are determined to have a greater relative proportion than natural languages being spoken by fewer human speakers during the duration of time.

16. A computer program product for delivering an announcement, the computer program product comprising one or more computer-readable tangible storage devices and program instructions stored on at least one of the one or more storage devices, the program instructions comprising:

program instructions to receive, from a plurality of microphones deployed in an environment, input representative of audio of a group of human speakers speaking in the environment in two or more natural languages during a duration of time, wherein each microphone of the plurality of microphones transmits respective audio signals on separate channels;

program instructions to process the input to identify the two or more natural languages being spoken in the environment by the group of human speakers during the duration of time;

program instructions to process the audio signals on each channel to identify a first utterance match for one of the identified two or more natural languages;

program instructions to, for each of the identified two or more natural languages, calculate a number of channels on which a first utterance match for that natural language was identified;

program instructions to process the input to determine a relative proportion of each of the identified two or more natural languages being spoken in the environment by the group of human speakers during the duration of time, wherein the relative proportion of a natural language is based, at least in part, on the calculated number of channels on which a first utterance match for that natural language was identified;

program instructions to determine two or more natural languages in which to deliver the announcement based, at least in part, on the relative proportion of each of the identified two or more natural languages being spoken in the environment by the group of human speakers during the duration of time;

program instructions to determine a descending sequential order in which to deliver the announcement in the determined two or more natural languages based, at least in part, on the relative proportion of each of the identified two or more natural languages; and program instructions to cause to be delivered the announcement in the determined two or more natural languages in the determined descending sequential order by transmitting the announcement to an announcement system.

17. The computer program product of claim 16, further comprising instructions, stored on at least one of the one or more storage devices, to receive and process the input at set intervals of time, and cause to be delivered the announcement in the determined two or more natural languages at set intervals of time.

18. The computer program product of claim 16, further comprising instructions, stored on at least one of the one or more storage devices, to cause the announcement to be delivered aurally.

19. The computer program product of claim 16, further comprising instructions, stored on at least one of the one or more storage devices, to cause the announcement to be delivered visually.

20. The computer program product of claim 16, wherein natural languages being spoken by more human speakers during the duration of time are determined to have a greater relative proportion than natural languages being spoken by fewer human speakers during the duration of time.

* * * * *